(12) United States Patent
Pal et al.

(10) Patent No.: US 8,717,183 B2
(45) Date of Patent: May 6, 2014

(54) LEAK DETECTOR

(75) Inventors: Maninder Pal, Coventry (GB); Neil Dixon, Coventry (GB); James Flint, Coventry (GB)

(73) Assignee: Severn Trent Water Limited (GB)

( * ) Notice: Subject to any disclaimer, the term of this patent is extended or adjusted under 35 U.S.C. 154(b) by 413 days.

(21) Appl. No.: 13/236,327

(22) Filed: Sep. 19, 2011

(65) Prior Publication Data

US 2012/0007744 A1 Jan. 12, 2012

Related U.S. Application Data

(63) Continuation of application No. PCT/GB2010/051371, filed on Aug. 19, 2010.

(30) Foreign Application Priority Data

Aug. 19, 2009 (GB) .................................. 0914463.5

(51) Int. Cl.
G08B 21/00 (2006.01)

(52) U.S. Cl.
USPC ................ 340/605; 73/40.5 A; 374/4; 702/51

(58) Field of Classification Search
USPC ................ 340/603, 604, 605; 73/40, 40.5 A, 73/40.5 R; 374/4; 702/33, 50, 51, 54, 56
See application file for complete search history.

(56) References Cited

U.S. PATENT DOCUMENTS

| | | | | |
|---|---|---|---|---|
| 4,083,229 A | * | 4/1978 | Anway | 73/40.5 A |
| 4,289,019 A | * | 9/1981 | Claytor | 73/40.5 A |
| 4,480,473 A | | 11/1984 | Varterasian | |
| 5,205,173 A | | 4/1993 | Allen | |
| 5,341,670 A | * | 8/1994 | Brook et al. | 73/40.5 A |
| 5,349,568 A | | 9/1994 | Kupperman et al. | |

(Continued)

FOREIGN PATENT DOCUMENTS

| | | |
|---|---|---|
| EP | 0711986 A2 | 5/1996 |
| EP | 0971221 A2 | 1/2000 |

(Continued)

OTHER PUBLICATIONS

Search Report of the United Kingdom; Application No. GB0914463.5; Issued: Jul. 17, 2010; 2 pages.

(Continued)

Primary Examiner — George Bugg
Assistant Examiner — Edny Labbees
(74) Attorney, Agent, or Firm — St. Onge Steward Johnston & Reens, LLC

(57) ABSTRACT

A leak detector for detecting and locating leaks in a water supply pipe of plastics, the leak detector comprising a first sensor at a first position arranged to detect a leak signal travelling along a pipe, a second sensor arranged to detect a leak signal travelling along the pipe at a second position spaced from the first position, and a processing device adapted to receive the signals from the first sensor and the second sensor. The processing device may be adapted to determine the velocity of the signals from characteristics of the leak signals. The processing device is adapted to use the velocity and distance between the first sensor and the second sensor to determine the location of a leak. The characteristics may be the relationship between the phase and frequency of the leak signals.

20 Claims, 2 Drawing Sheets

(56) References Cited

U.S. PATENT DOCUMENTS

| | | | |
|---|---|---|---|
| 5,974,862 A * | 11/1999 | Lander et al. | 73/40.5 A |
| 6,453,247 B1 * | 9/2002 | Hunaidi | 702/51 |
| 6,530,263 B1 | 3/2003 | Chana | |
| 7,607,351 B2 * | 10/2009 | Allison et al. | 73/592 |
| 7,698,946 B2 * | 4/2010 | Clarke et al. | 73/601 |
| 7,891,246 B2 * | 2/2011 | Lander | 73/592 |
| 8,539,820 B2 * | 9/2013 | Al-Qahtani et al. | 73/40.5 A |
| 2003/0093174 A1 | 5/2003 | Nikulin | |
| 2003/0167847 A1 | 9/2003 | Brown et al. | |
| 2004/0093174 A1 | 5/2004 | Lander | |
| 2008/0314123 A1 | 12/2008 | Kaji et al. | |

FOREIGN PATENT DOCUMENTS

| | | |
|---|---|---|
| EP | 2006654 A2 | 12/2008 |
| GB | 2364126 A | 1/2002 |
| GB | 2367362 A | 4/2002 |
| GB | 2378756 A | 2/2003 |
| JP | H11201859 A | 7/1999 |
| WO | 0151904 A2 | 7/2001 |
| WO | 0201173 A1 | 1/2002 |
| WO | 2006136013 A1 | 12/2006 |

OTHER PUBLICATIONS

International Search Report; Application No. PCT/GB2010/051371; Issued: Nov. 26, 2010; 3 pages.

Yang, et al., "Application of Blind System Identification in Acoustic Source Location", 10th International Conference on Control, Automation, Robotics and Vision, pp. 1764-1768, Dec. 2008.

Canadian Examination Report Application No. 2,746,802 Dated: Mar. 7, 2013 12 pages.

Gao, et al., "Detecting Leaks in Buried Plastic Pipes using Correlation Techniques: Part 1. A Model of the Correlation Function of Leak Noise", Proceedings of the 18th International Congress on Acoustics, pp. V-3659-V-3662, 2004.

Young-Sup Lee, "Effects of Windowing Filters in Leak Locating for Buried Water-Filled Cast Iron Pipes", Journal of Mechanical Science and Technology, vol. 23, Issue 2, p. 401-408, Feb. 2009.

Daneti, "On Using Phase Data Information for Pipeline Leak Location"; IEEE 25th Convention of Electrical and Electronics Engineers in Israel, 2008, IEEE!, 2008, p. 494-498, Dec. 2008.

Stoianov, et al., "PIPENET: A Wireless Sensor Network for Pipeline Monitoring ", 6th International Symposium on Information Processing in Sensor Networks, 2007, p. 264-273, Apr. 2007.

\* cited by examiner

LEAK DETECTOR

CROSS-REFERENCE TO RELATED APPLICATIONS

The present application is a continuation of pending International patent application PCT/GB2010/051371 filed on Aug. 19, 2010 which designates the United States and claims priority from United Kingdom patent application 0914463.5 filed on Aug. 19, 2009, the content of which is incorporated herein by reference.

FIELD OF THE INVENTION

This invention relates to a leak detector for detecting and locating the position of a leak in a water supply pipe and, in particular, for detecting and locating the position of a leak in a water supply pipe of plastics such as polyethylene and specifically medium density polyethylene pipes (MDPE). In particular, it relates to a leak location detector using cross-correlation. It also relates to a method of detecting and locating the position of a leak in a water supply pipe of plastics, and in particular polyethylene such as medium density polyethylene.

BACKGROUND OF THE INVENTION

Water utilities in many parts of the world are facing growing challenges in their attempts to meet the demand for drinking water. This is due to a number of factors like climate change, extended periods of drought, population growth, migration and temperature rise which are exerting increasing pressure on existing water supplies. Another key factor is the leakage from water transmission and distribution networks. Leakage occurs due to deterioration and damage of networks and constitutes a major portion of water loss in water supply networks. Thus, the reduction of leakage from the water supply system is a vital strategy in the improvement of sustainable use of water.

A leak in a water supply pipe generates a sound which travels (in both upstream and downstream directions) along the water column inside pipe and the pipe shell, and the soil surrounding the pipe. This sound is commonly referred to as a leak signal, which comprises both acoustic and vibrational signals. It can be detected using acoustic leak detection equipment such as listening sticks and correlators; commonly used by the water industry. The distance up to which these leak signals can be detected depends upon the characteristics of pipe. In recent years, pipes of plastics such as MDPE have been increasingly favoured over older pipe materials such as metal (cast iron, etc) and concrete due to their lower rate of deterioration when in service. The sound caused by a leaking pipe is highly attenuated in pipes of plastics, particularly MDPE. Accordingly, it is very difficult to detect and locate water leaks in pipes of plastics such as polyethylene using currently available acoustic emission detection systems.

The accurate location of leaks is particularly important as it is expensive in terms of time, cost and physical efforts involved to find a leak, due to the excavation required to reach underground pipes.

SUMMARY OF THE INVENTION

According to a first aspect of the invention we provide a leak detector for detecting and locating leaks in a water supply pipe of plastics, the leak detector comprising a first sensor at a first position arranged to detect a leak signal travelling along a pipe, a second sensor arranged to detect a leak signal travelling along the pipe at a second position spaced from the first position, and a processing device adapted to receive the signals from the first sensor and the second sensor. The processing device may be adapted to determine the velocity of the leak signals from characteristics of the leak signals. The processing device is adapted to use the velocity and distance between the first sensor and the second sensor to determine the location of a leak.

This is advantageous as the leak detector is able to accurately detect and determine the location of a leak in a pipe using the velocity of the leak signals derived from characteristics of the signals. The leak signals detected by the sensors comprise acoustic and vibrational signals caused by a leak and noise signals. The processing device has been found to be accurate and capable of determining the velocity of the leak signals despite high levels of noise signals. Accordingly, the measurements made of the characteristics of the leak signals and the distance between the sensors are used to calculate the velocity of the leak signals.

Known correlators use pre-defined values of velocity stored in a database. These predetermined empirical values are calculated using various theoretical and/or experimental methods. Selection of the appropriate value of velocity in known correlators depends upon the input of the user on the dimensions and material properties of pipe section between the two sensor positions. In practice, water distribution networks have many discontinuities in pipe physical properties and joints. The velocity of leak signals varies considerably with these physical properties of pipe. Because of the incomplete record of these discontinuities such as a change of pipe material (for example, due to repair work) between the two measuring positions, it is very cumbersome to accurately determine the propagation velocity using the existing methods, each time the correlation is performed. The present invention overcomes this problem by determining the velocity of the leak signals from measured characteristics of the signals themselves.

The processing device may be adapted to determine the velocity of the leak signals using the characteristic of a linear relationship between the phase and frequency of the leak signals. This is advantageous as it has been found that use of the linear phase-frequency relationship yields accurate results in the frequency range that leak signals are prevalent in pipes of plastics and, in particular, MDPE.

Preferably, the characteristic are the phase and frequency of the leak signals and the processing device may use a ratio between the phase and the frequency of the leak signals to calculate the velocity.

Preferably the processing device is arranged to determine the Fourier transform of the leak signals detected at both the first and second sensors and is further arranged to multiply the Fourier transforms obtained and use this in the determination of the velocity of the leak signals.

Preferably, the first sensor and the second sensor each comprise an accelerometer. This type of sensor has been found to be particularly suitable for measuring the vibrational signals due to leaks in pipes of plastics such as MDPE.

Preferably the first and second sensors each include a signal conditioning element arranged to filter the signals received by the respective sensors and a transmitting element adapted to transmit the filtered signals to the processing device. This is advantageous as the signal conditioning elements can filter the signal so that only the most relevant range of frequencies are transmitted to the processing device. Preferably, the signal conditioning elements include low-pass filters wherein the pass-band is substantially below 760 Hz.

The spectral content of leak signals derived from all types of leaking pipes typically contains frequencies substantially lower than 760 Hz and therefore only the relevant frequencies are considered.

Preferably the leak detector includes a transmitting element and a receiving element arranged such that the first sensor and the second sensor with their associated signal conditioning elements can operate wirelessly with respect to the remainder of the leak detector and wherein the transmitting element is adapted to preserve the phase of the leak signal detected by the first sensor and to preserve the phase of the leak signal detected by the second sensor.

Preferably, the processing device is adapted to digitize and store the signals received from the first sensor and the second sensor. This is advantageous as the period over which the signals are obtained can be set depending on the amount of noise present and, as the data is stored, it can be processed by the processing device at a later time or processed several times to ensure accuracy.

Preferably the processing device includes a fine filtering element adapted to filter the digitised leak signals, the fine filtering element comprising a Bessel Finite Impulse Response (FIR) filter. In particular, the fine filtering element preferably comprises a ninth order Bessel low pass filter and an eighth order Bessel high pass filter. This choice of filter has been found to be advantageous in isolating the leak signals caused by the leak in the signals detected by the first and second sensors. The Bessel FIR filters have a linear phase response and are therefore useful for isolating leak signals.

Preferably, the processing device includes a windowing element adapted to apply a Hanning window to the signals obtained from the first sensor to obtain a plurality of windowed signals and to the signals obtained from the second sensor to obtain a plurality of windowed signals. The windowing element is adapted to split the leak signals from each sensor into a plurality of signals suitable for Fourier Transform and averaging.

Preferably the processing device includes a transform element adapted to apply a Fast Fourier Transform to the windowed signals. The signals originating from the first and second sensors can then be processed in frequency domain, which simplifies the processing.

Preferably the processing device includes an averaging element, the averaging element adapted to calculate the root mean square average of the plurality of windowed signals from the first sensor following the application of the Fourier transform to each of the windowed signals and the root mean square average of the plurality of windowed signals from the second sensor following the application of the Fourier transform to each of the windowed signals.

Preferably the processing device includes a velocity determination element arranged to determine the velocity of the leak signals from the characteristics of the leak signals and the distance between the first sensor and the second sensor, wherein the velocity is obtained by the following equation;

$$c = \frac{-\omega D}{\phi^m_{x_1 x_2}(\omega)} \quad (1)$$

where c comprises the velocity of the signals, $\omega$ represents angular frequency, D the distance between the first and second sensors and $\phi^m_{x_1 x_2}(\omega)$ the phase of the product of the Fourier Transform of first signal ($x_1$) from first sensor and Fourier Transform of signal ($x_2$) from second sensor.

Preferably, the processing device includes a leak location element adapted to receive the velocity calculated by the velocity determination element, the leak location element is also adapted to perform cross-correlation of the signal from the first sensor with the signal from the second sensor and using the results of the cross-correlation and the velocity, calculate the location of the leak with respect to either the first sensor position or second sensor position.

Velocity and attenuation of leak signals with distance in pipes play an important role in determining leak position using the correlation method. Prior art methods require a prior knowledge of the pipe's physical properties and a known leak signal/transient event source, which are not always easy to obtain in practice. Therefore, this new method based on the linear phase frequency relationship of leak signals is particularly advantageous. The velocity and attenuation of waves propagating in a finite length pipe can be determined from the pressure measurements made at two locations along the length of pipe under survey. The velocity can be obtained from the linear phase frequency relationship of the product of the Fourier Transform of the leak signals measured at two locations, using the least squares linear regression. The attenuation is calculated by comparing the transfer functions at the two leak signal measurement positions.

According to a second aspect of the invention we provide a method of detecting the position of a leak in pipes of plastics comprising the steps of;

listening for a leak signal at a first position along a pipe;
listening for a leak signal at a second position along a pipe spaced from the first position;
determining a sensor spacing distance between the first position and the second position;
determining the velocity of the leak signals from characteristics of the signals; and
identifying the location of a leak using the sensor spacing distance and the velocity.

The steps of listening for a signal indicative of a leak may be performed over a predetermined measurement period.

Preferably the step of identifying the location of the leak comprises determining the time delay between the leak signals received at the first sensor and the second sensor positions using a correlation function and identifying the location of a leak using the sensor spacing distance, the velocity and the time delay.

Preferably the method includes the step of performing cross-correlation with the signal obtained at the first position and the signal received at the second position.

Preferably, the method includes the step of confirming a leak is detected in the correlation function by determining if a distinctive peak is obtained. This can be achieved by the user of the device or an appropriate peak detection algorithm.

According to a third aspect of the invention we provide a leak detector of leaks in water supply pipes of medium density polyethylene, the leak detector comprising a first sensor at a first position arranged to detect a leak signal travelling along a pipe, a second sensor arranged to detect the leak signal travelling along the pipe at a second position spaced from the first position, and a processing device adapted to receive the signals from the first sensor and the second sensor, the processing device adapted to determine the location of a leak using cross-correlation over a frequency range of the leak signals between 0 Hz and 350 Hz.

This is advantageous as this frequency range has been found to contain sufficient information to accurately identify the position of the leak in MDPE. Accordingly, the leak detector of leaks in MDPE pipes of the present invention is able to accurately and repeatably locate leaks where prior art correlators have failed.

Preferably, the frequency range is between 20 Hz and 140 Hz and most preferably between 40 Hz and 110 Hz. These narrower frequency ranges enable accurate location of the leak in MDPE pipes while minimising the amount of processing of the leak signals. Preferably, the first sensor and second sensor comprise accelerometers adapted to reliably operate at frequencies below 110 Hz. This is advantageous as accelerometers can accurately measure frequencies in the range defined in the third aspect of the invention when they are configured appropriately.

BRIEF DESCRIPTION OF THE DRAWINGS

There now follows by way of example only a detailed description of the present invention with reference to the accompanying drawings in which.

DETAILED DESCRIPTION OF THE INVENTION

Figure 1:
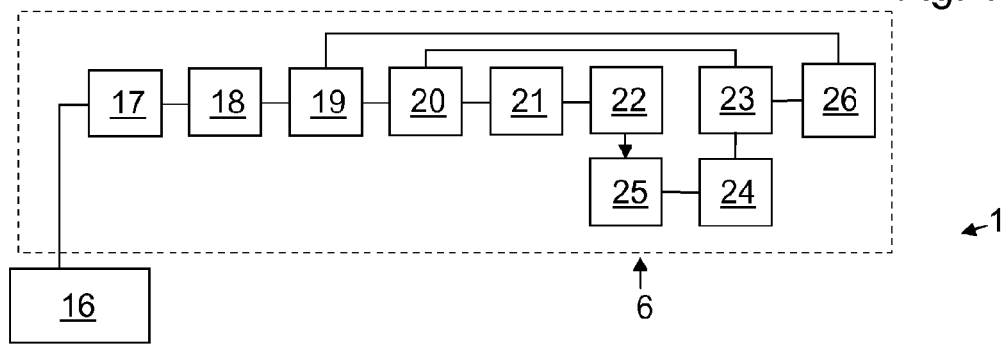
FIG. 1 shows a diagram of an embodiment of the leak detector and a leaking pipe.

A leak detector 1 for identifying the position of a leak 2 in a pipe 3 is shown in FIG. 1. The pipe 3, in this embodiment, is of plastics and, in particular, medium density polyethylene (MDPE). The leak detector 1 comprises a first sensor 4 and a second sensor 5. The first and second sensors 4 and 5 are accelerometers. Specifically they are ceramic crystal based piezo-electric accelerometer type sensors. The sensors 4, 5 detect the sound and vibrations (i.e. vibro-acoustic signals) travelling along the pipe 3 and, if a leak 2 is present, leak signals, which comprises the sound indicative of a leak. The leak signals detected by the sensors 4, 5 include noise which comprises a combination of pipe resonance and ambient noise, such as from traffic, people and water flow due to consumption by customers.

If we let the detected signal from the first sensor 4 be represented as $x_1$, which is a function of time, t, and comprises the sum of the contribution due to the leak signal ($s_1$) and the contribution due to noise ($n_1$). Thus, $$x_1(t)=s_1(t)+n_1(t) \quad (2)$$

Similarly, the detected signal form the second sensor 5 can be represented as $x_2$ where $$x_2(t)=s_2(t)+n_2(t) \quad (3)$$

The signals detected by the first and second sensors 4 and 5, are received by a processing device 6, which is adapted to calculate the velocity of the leak signals within the detected signals. The processing device 6 is adapted to use the calculation of velocity of the leak signals to determine the location of the leak 2.

The first sensor 4 is shown attached to a first hydrant 7 connected to a length of pipe 3 that potentially has a leak 2. The second sensor 5 is attached to a second hydrant 8 connected to the same length of pipe 3. The sensors 4, 5 include a magnetic attachment to secure them to the hydrants 7, 8. The sensors 4, 5 are preferably able to measure accelerations less than 0.01 g and are capable of operating at frequencies as low as 1 Hz. The first sensor 4 records a first signal and the second sensor 5 records a second signal.

The first sensor 4 is connected to a first signal conditioning element 10 and the second sensor 5 is connected to a second signal conditioning element 11. The first signal conditioning element 10 and the second signal conditioning element 11 comprise analogue filters arranged to limit the bandwidth of the detected signals received by the sensors 4, 5. The first filters 10, 11 in this embodiment are low-pass filters set to pass frequencies below 760 Hz. This is advantageous as it had been found that the frequency range up to 760 Hz contains the frequencies at which leak signal are found in all common types of pipe material. Therefore, the amount of information to be sent from the sensors 4, 5 is reduced while retaining the frequencies of interest. The first and second signal conditioning elements 10 and 11 are also adapted to amplify the signals. The gain is set to 20 dB, although it may be adjustable. The amplifiers of the signal conditioning elements 10, 11 incorporate a transformer balanced input and output to produce low-noise, low-distortion adjustable gain between 0 dB to 66 dB maximum. They work in the 10 Hz to 50 kHz audio bandwidth and provide a wide dynamic range exceeding 120 dB.

The first and second signal conditioning elements 10 and 11 may include adjustable gain amplifiers. This makes them more flexible for detecting different types of leaks. Further, the first and second signal conditioning elements 10 and 11 may have independently adjustable gain. This is advantageous as the leak may be close to one of the first and second sensors and therefore more gain may be required for the sensor distant from the leak. The gain of the first and second signal conditioning elements 10 and 11 is communicated to the processing device 6.

Preferably, the gain of the first signal conditioning element 10 and the gain of the second signal conditioning element 11 is set to the same amount. This configuration maintains the transfer function of the sensors, which results in accurate results when compared to systems employing automatic gain control.

The filtered first and second signals from the signal conditioning elements 10 and 11 are received by transmitting elements 12 and 13 respectively. The transmitting elements 12 and 13 include antenna 14 and 15 respectively for wirelessly transmitting data. The transmitting element 12 is arranged to transmit the detected signals from the first sensor 4 to a receiver 16. The transmitting element 13 is arranged to transmit the detected signals from the second sensor 5 to the receiver 16. The transmitting elements 12 and 13 operate in the License Free UHF range, with a frequency response of 10 Hz to 18 kHz; signal-to-noise ratio of greater than 110 dB and a HDX compander to reduce the noise interference.

The receiver 16 passes the received first signals and the second signals to the processing device 6. The processing device 6 first digitizes the signals from the first sensor 4 and the signals from the second sensor 5 using analogue-to-digital convertor 17. The analogue-to-digital convertor has a resolution of 12 bits/sample and the sampling rate is set to 2.5 kHz. The digital signals are then recorded by recording element 18. The recording element 18 typically comprises a hard disk drive of a computer. The processing device 6 includes a fine filtering element 19 comprising a digital filter that is arranged to filter the recorded, digital first and second signals.

The fine filtering element 19 is adapted to filter to 1 Hz spacing. The fine filtering element 19 comprises Bessel Finite Impulse Response (FIR) filter and, in particular, a ninth order Bessel low pass filter and an eighth order Bessel high pass filter. The cut-off of the low pass filter is set to substantially 350 Hz and the cut-off of the high pass filter is set to 15 Hz. It has been found that these settings are particularly advantageous for MDPE pipes. If the user does not know the pipe material they can set the fine filtering element 19 to pass a broad bandwidth of 10 Hz to 760 Hz, for example, and then review the frequency spectrum results to determine the most suitable frequency range for the pipe under examination. This is discussed in more detail below. The Bessel FIR filters have a maximally flat group delay. They also have a linear phase response and they preserve the wave shape of the signals in the pass band, which minimises the disruption to the linear phase-frequency relationship of the leak signals. This choice of digital filter has been found to be particularly advantageous to isolate leak signals. The preservation of the linear phase-frequency relationship is important as this relationship enables a particularly accurate calculation of the velocity of the leak signals, as discussed in more detail below. Also, a high order Bessel filter has a high roll-off rate and a better linear flat pass band, which helps to preserve the relationship.

The first signals and the second signals from the fine filtering element 19 are then passed to a windowing element 20. The windowing element 20 applies a Hanning window to the signals with a 50% overlap between windows. This results in a plurality of windowed first signals from the first sensor 4 and a plurality of windowed second signals from the second sensor 5. The width of the Hanning window is set such that it is equal to the size of a Fast Fourier Transform applied by a transform element 21 discussed below. The 50% overlap of the windows is taken to avoid the circular effect of Fast Fourier Transform applied by the transform element 21. Also, due to the shape of the window at its edges, the overlap ensures the leak signals at the edges of the window are considered. The windowing element 20 is arranged to window the leak signals from the first digitized sample.

The transform element 21 is arranged to apply a Fast Fourier Transform to the each of the windowed first signals and each of the windowed second signals. The signals can now be processed further in the frequency domain. The transform is taken using Fast Fourier Transform (FFT) with the size 1024 points. Its size can be changed if any of the sampling rate, frequency resolution and length of time delay needs to be changed. The default value of 1024 is chosen as the typical distance, D, over which the leak detector operates is approximately 100 m. The average speed of the leak signals is approximately 350 m/s and therefore about 0.3 seconds of sampling is required to ensure the leak signals are detected by both sensors 4, 5. Thus, when sampled at 2.5 kHz, approximately 1024 points are required. It will be appreciated that a different number of points can be used depending on the set-up of the system.

The next processing element of the processing device 6 comprises an averaging element 22. The averaging element 22 is adapted to calculate the root mean square average of between 10 to 25 of the FFT transformed windowed signals. In the present embodiment, an average over 15 windowed signals is determined. The noise in the leak signals is random in amplitude and phase. When averaging is performed the overall noise level falls, as the signal from the leak signals have been found to be fairly constant.

The averaged signals may then be displayed to a user by way of a display device. The magnitude of the signals with respect to frequency and time is displayed to the user to enable them to identify a frequency range where leak signals are present in the results. As discussed above, the user may adjust the settings of the fine filtering element 19 to focus on the frequency range of interest, if required. Alternatively, the processing device 6 may include a leak signal frequency determination element (not shown) to select a range of frequencies. The leak signal frequency determination element can be implemented using algorithms to process the output from the averaging element 22.

A cross-correlation element 23 receives the results from the windowing element 20 and performs cross-correlation on each respective pair of windows signals from the first sensor 4 and the second sensor 5 to obtain a correlation function. Thus, the first windowed signal from the first sensor 4 is adapted to be cross-correlated with the first windowed signal from the second sensor 5. The cross-correlation element 23 is then adapted to cross correlate the second windowed signal from the first sensor 4 and the second sensor 5, and so on. The cross-correlation element 23 is adapted to operate in the frequency domain and to apply a pre-filter prior to cross-correlation. In this embodiment, the element 23 applies a Smoothed Coherence Transform (SCOT) weighting factor to the signals. It will be appreciated that the signals include a significant amount of noise. The application of the SCOT weighting factor prior to cross-correlation has been found to be particularly advantageous for obtaining accurate cross-correlation for signals with large amount of noise. The SCOT weighting function sharpens the peaks in the resulting cross-correlation function and also attenuates the frequency regions affected by noise.

The cross-correlation element 23 determines if the correlation function contains a distinct peak that indicates the presence of a leak in the pipe 3 under survey. A user may identify a distinct peak in a graphical representation of the results. The position of the distinct peak can then be input into a leak location element 24 by the user. Alternatively, a peak detection algorithm may be used, such as the "peakdet" algorithm in Matlab, which would be readily implemented by a skilled person.

If the cross-correlation element 23 determines that a leak is present, the leak location element 24 is used to calculate the position of the leak. To determine the position, the leak location element 24 requires the velocity of the leak signals and the time delay between the leak signal being received at one of the first and second sensors 4, 5 and the other. The time delay can be extracted from the correlation function calculated by the cross-correlation element 23. The velocity is calculated by a velocity determination element 25.

Thus, processing device 6 also includes the velocity determination element 25. The velocity determination element 25 is adapted to derive the velocity of the leak signals from a linear phase-frequency relationship characteristic of the leak signals. In particular, it has been found that both the individual and relative phase of leak signals vary linearly with frequency and the velocity can be calculated from the gradient of this linear phase-frequency relationship.

Leak signal characteristics are dependent on the wave number which varies considerably for the fluid filled elastic shells such as polyethylene pipes. In practice, for any leak in a pipe there are many waves in a pipe; however, only one wave (s=0, n=0) has been found to play a dominant role in the propagation of leak noise and carry most of the energy through the pipe and fluid. For this wave, acoustic pressure can be considered uniform across the cross-section and in the frequency domain it is given by;

$$P(L)=P_0(\omega)e^{-jkL}=P_0(\omega)e^{-\omega\alpha L}e^{-j\omega L/c} \qquad (4)$$

where L is the distance between leak position and sensor position, $P_0$ is the amplitude of acoustic pressure at L=0; k is the complex fluid-borne wavenumber given by $k=\omega/c-j\alpha\omega$ and phase ($\phi$) is given by $$\phi=-\omega L/c \qquad (5)$$

It can be seen that leak signals are an exponentially decaying functions and have a negative phase. With reference to the above equation, for a particular frequency, phase is dependent on the distance of the sensor position from leak location and the velocity of leak signals. Consequently, for a constant distance and velocity, the phase will vary linearly with frequency. Thus, we have found that the velocity of leak signals can be calculated from the slope of the linear relationship between phase and frequency.

Figure 3:
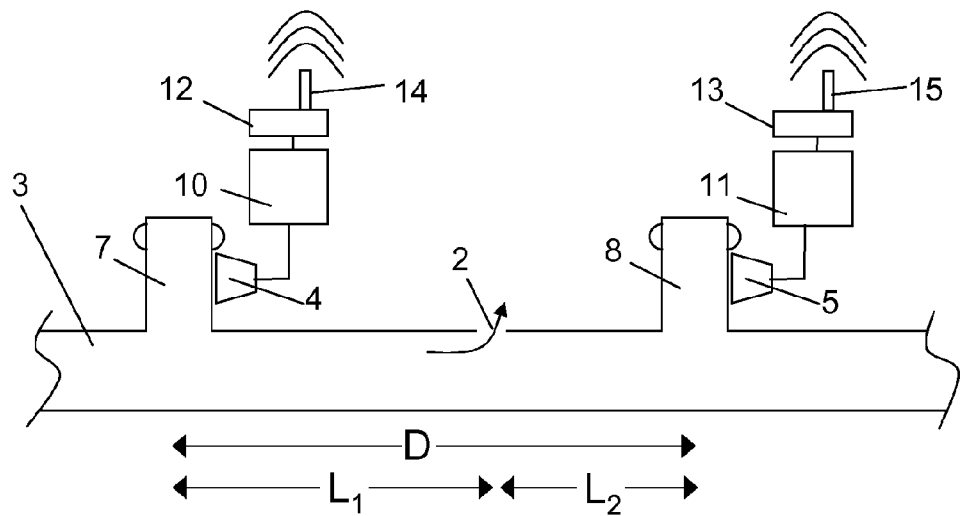
FIG. 3 shows a diagram of how the velocity of the leak signals are calculated from characteristics of the leak signals.
Figure 3:
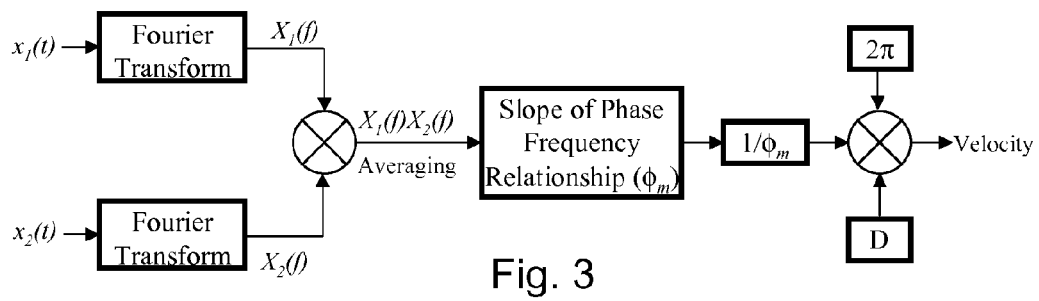

FIG. 3 shows diagrammatically how the velocity of the leak signals is calculated. To calculate the speed of the leak signals, the Fourier Transforms of the first signals and the second signals from transform element 21 are multiplied and averaged over a theoretically infinite observation interval (T) such that;

$$S_{x_1x_2}^m(\omega) = \lim_{T\to\infty} \frac{1}{T} \int_{-\infty}^{\infty} \int_{-\infty}^{\infty} (P_0(\omega))^2 e^{-\omega\alpha(L_1+L_2)} \quad (6)$$
$$e^{-j\omega(L_1+L_2)/c} df d\tau$$
$$= S_{ll}(\omega)\Psi^m(\omega)e^{-j\omega(L_1+L_2)/c}$$

where $L_1$ and $L_2$ are the respective positions of the first sensor 4 and the second sensor 5 from the leak 2 as shown in FIG. 1, $S_{ll}(\omega)$ is the auto-spectral density of the leak signals and;

$$\Psi^m(\omega) = |p_1(\omega,L_1)p_2(\omega,L_2)| = |p_0(\omega)|^2 e^{-\omega\alpha(L_1+L_2)} = |p_0(\omega)|^2 e^{-\omega\alpha D} \quad (7)$$

where D is the total distance between the first and second sensors and $p_1(\omega, L_1)$ and $p_2(\omega, L_2)$ denotes the Fourier Transform of leak signals measured at the first sensor and second sensor respectively. The argument of equation 7 gives the phase of the product of the Fourier Transform of the two leak signals as;

$$\phi_{x_1x_2}^m(\omega) = \text{Arg}\{S_{x_1x_2}^m(\omega)\} = -\omega(L_1+L_2)/c = -\omega D/c \quad (8)$$

where $\phi_{x_1x_2}^m(\omega)$ is the phase of the product of the Fourier Transform of the first signal ($x_1$) and Fourier Transform of the second signal ($x_2$). From equation 8, it can be inferred that the phase of the product of Fourier Transform of leak signals measured at two locations varies linearly with frequency, $\omega$. The velocity c can be calculated from the slope of this linear relationship between $\phi_{x_1x_2}^m(\omega)$ and angular frequency $\omega$, provided the distance D is known, which can be measured quite accurately using various methods such as measuring wheel/tape. The benefit of this method is that the velocity can be determined from the measured signals and there is no need to employ the methods of the prior art for estimating the velocity or simulating a leak for measuring velocity. This method requires the total distance (D) between the two sensor positions so any leak on the pipe can be considered. This method has been found to produce accurate results. Accuracy can be further improved by ensuring high coherence between the signals measured at the first sensor and the second sensor. This can be improved by using a shorter sensor spacing, D.

Accordingly, the leak location element 24 is adapted to calculate the distance to the leak from the first sensor 4 and the distance to the leak from the second sensor 5. If the time taken by the leak signals to travel from the leak position 2 to the first sensor position is $t_1$ and to the second sensor position is $t_2$, then the time delay between measured signals ($x_1(t)$ for the first sensor and $x_2(t)$ for the second sensor) is related to leak location as $$\tau_{shift} = t_2 - t_1 = \frac{L_2 - L_1}{c} \quad (9)$$

where, c is the propagation speed of leak signals in the pipe 3 and water column, and $L_1$ and $L_2$ are the respective sensors positions 1 and 2 from leak position. If the total distance ($L_1+L_2$) between the two sensors position is D, then the position of leak relative to sensor position 1 is given by $$L_1 = \frac{D - c\tau_{shift}}{2} \quad (10)$$

A coherence element 26 may be used to determine the frequency over which to perform cross-correlation. Thus, in situations where the cross-correlation element 23 does not identify a distinct peak, it may pass the first and second signals to the coherence element 26 for further processing. The coherence element 26 receives the signals from the fine filtering element 19 associated with the first sensor 4 and the signal associated with the second sensor 5. The coherence element 26 is arranged to determine the coherence of the signal originating from the first sensor 4 with the signal originating from the second sensor 5. The coherence of two signals represents the degree to which the two signals are related on a scale of 0 to 1. The closer the coherence is to 1, the more the two signals are related. The coherence of two signals is calculated at each frequency. When coherence is performed over the leak signals obtained from the first and second sensor positions, it will result into a coherence value for each frequency, for example from 15 Hz to 350 Hz for the present setting for MDPE pipes. The frequencies for which the coherence is highest is considered as the frequency range over which the correlation should be performed. The range of frequencies determined by the coherence element 26 is arranged to be sent to the cross-correlation element 23 so that cross-correlation can be performed over the range of frequencies identified.

Figure 2:
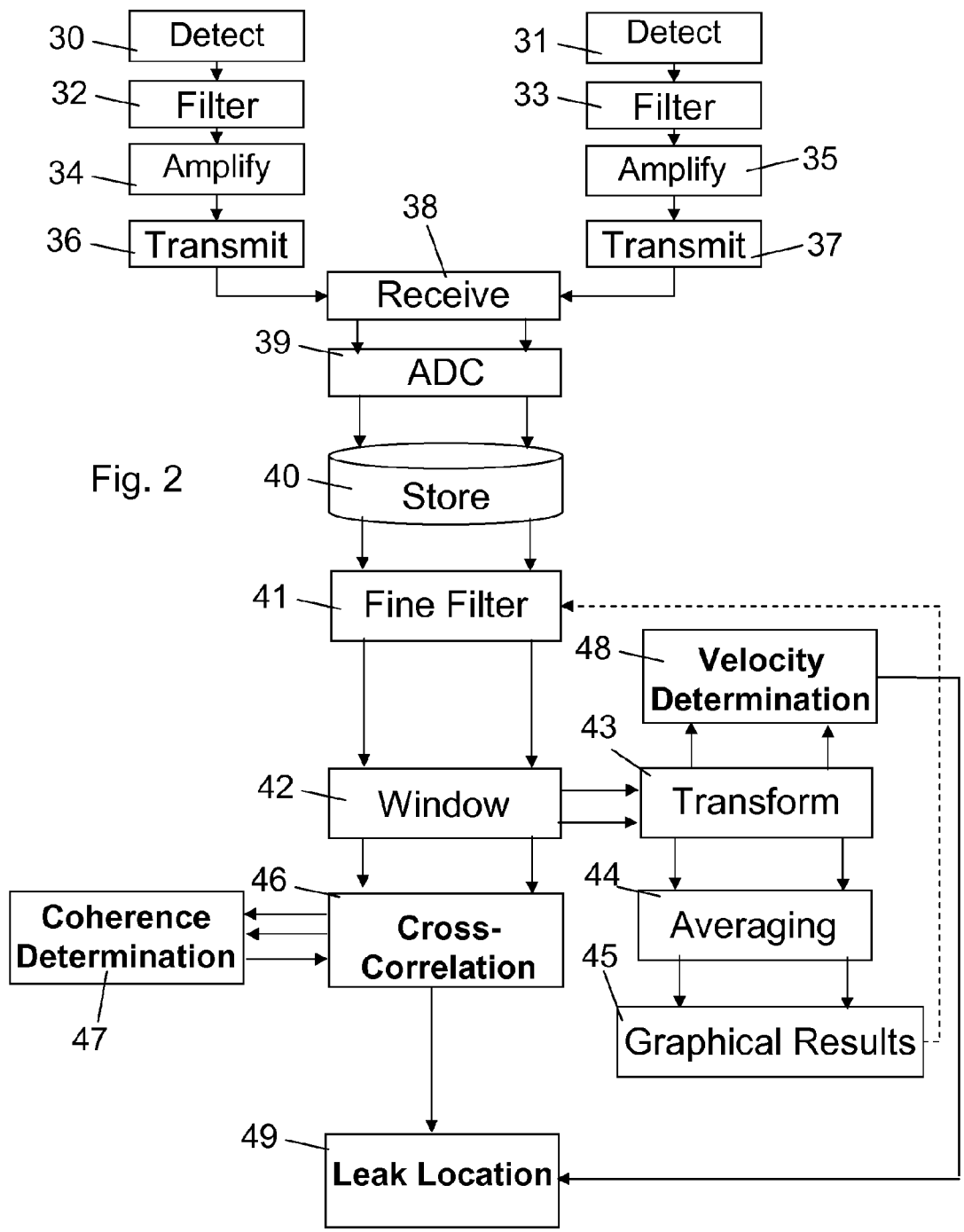
FIG. 2 shows a flow chart depicting an embodiment of a method of operation of the leak detector.

FIG. 2 shows a flow chart showing an embodiment of a method of operation of a leak detector.

Step 30 represents the first sensor 4 detecting signals from the hydrant 7 to which it attached. Similarly, step 31 shows the second sensor 5 simultaneously obtaining signal from the second hydrant 8. Steps 30 and 31 are performed over a predetermined measurement period, T. In the present embodiment, T is set to 5 minutes.

Step 32 represents the signals from the first sensor 4 being passed through a low-pass filter of the signal conditioning element 10 set to pass frequencies below 760 Hz. Step 33 represents the signals from the second sensor 5 being passed through a low-pass filter of the signal conditioning element 11 set to pass frequencies below 760 Hz.

Step 34 and step 35 comprise the filtered signals from steps 32 and 33 being amplified prior to transmission at steps 36 and 37 by amplifiers 12 and 13 respectively.

The signals are received by the receiver 16 at step 38 and are then digitized by an analogue-to-digital convertor at step 39 and then the signals are recorded at step 40. It will be noticed that two arrows represent the passage of the signals between each of the steps, as the leak signals derived from the first sensor 4 are processed separately from the leak signals derived from the second sensor 5.

Step 41 represents the application of the fine filtering element 19. In step 41, a ninth order Bessel low pass filter and an eighth order Bessel high pass filter is applied to the digitised signals. If the pipe material is known, an appropriate frequency range can be selected by default. For example, leak signals in MDPE pipes are typically present in the range 15 to 350 Hz. If the pipe material is not known, this step involves fine filtering at 10 to 760 Hz.

The fine filtered signals from step 41 are then windowed at step 42 by windowing element 20. A Hanning window is applied to the fine filtered signals with a 50% overlap between windows. This results in a plurality of windowed signals originating from the first sensor 4 and a plurality of windowed signals originating from the second sensor 5.

A Fast Fourier Transform is applied to the windowed signals at step 43 by transform element 21. The plurality of signals can now be processed further in the frequency domain.

The root mean square (RMS) average of approximately 15 of the Fourier Transform of the windowed signals from the first sensor is calculated at step 44 by the averaging element 22. Similarly, the RMS average of approximately 15 of the Fourier transforms of the windowed signals from the second sensor is calculated.

At step 45, the results of the averaging element 22 may be displayed to the user. The user may identify the frequencies that leak signals are present and input this to focus the fine filtering of fine filtering element 19. Alternatively, this process may be automated and the conclusion fed back to fine filtering element 19. Thus, the method may return to step 41 for further fine filtering. Otherwise, the method proceeds to step 46. It will be appreciated that if the pipe material is known, steps 43, 44 and 45 may not be performed and the method may proceed directly to step 46.

Step 46 comprises the process of cross-correlation of a windowed signal from the first sensor 4 with the corresponding windowed signal from the second sensor 5.

Step 47 represents determining the coherence between the two signals so that cross-correlation can be performed on the most highly correlated range of frequencies. It will be appreciated that the step 47 of coherence determination is optional and instead, cross-correlation may be performed over the frequency range determined by the fine filtering element 19.

If a leak is detected by the presence of a distinct peak in the correlation function, the method proceeds to step 48, which comprises velocity determination from the linear phase-frequency relationship of the signals.

Once the velocity has been determined, step 49 shows the location of the leak using the velocity of the signals, the time delay between their receipt at one of the sensors 4, 5 and the other, and the distance between the first sensor position and the second sensor position.

It will be appreciated that although this embodiment has been described in relation to finding a leak in a pipe of medium density polyethylene, it can be effectively utilised to locate leaks in pipe of other materials by changing the settings of digital filters, as discussed above.

What is claimed is:

1. A leak detector for detecting and locating leaks in a water supply pipe of plastics, the leak detector comprising:
   a first sensor at a first position arranged to detect a leak signal travelling along a pipe;
   a second sensor arranged to detect a leak signal travelling along the pipe at a second position spaced from the first position; and
   a processing device adapted to:
   receive the signals from the first and second sensors;
   fine filter the signals from the first and second sensors using first filter settings;
   analyse the fine filtered signals from the first and second sensors to identify a frequency range where leak signals are present;
   fine filter the signals from the first and second sensors using second filter settings, based on the identified frequency range;
   using the leak signals fine filtered with the second filter settings, determine a velocity of the leak signals from measurement of characteristics of the leak signals; and
   using the velocity and a distance between the first sensor and the second sensor, determine a location of a leak.

2. A leak detector according to claim 1, in which the characteristics are the phase and frequency of the leak signals.

3. A leak detector according to claim 2, in which the processing device is adapted to determine the velocity of the leak signals using a linear relationship between the phase and frequency of the leak signals.

4. A leak detector according to claim 1, in which the first and second sensors each include a signal conditioning element arranged to filter the signals received by the respective sensors and a transmitting element adapted to transmit the filtered signals to the processing device.

5. A leak detector according to claim 4, in which the signal conditioning elements include low-pass filters wherein the pass-band is substantially below 760 Hz.

6. A leak detector according to claim 4, in which the leak detector includes a receiving element, wherein the transmitting elements of the first sensor and second sensor and the receiving element are arranged such that the first sensor and the second sensor and their associated signal conditioning elements can operate wirelessly with respect to the remainder of the leak detector and wherein the transmitting element is adapted to preserve the phase of the leak signal detected by the first sensor and to preserve the phase of the leak signal detected by the second sensor.

7. A leak detector according to claim 1, in which the processing includes a windowing element adapted to apply a Hanning window to the fine filtered signals from the first sensor to obtain a plurality of windowed signals and to the fine filtered signals from the second sensor to obtain a plurality of windowed signals.

8. A leak detector according to claim 7, in which the processing device includes a transform element adapted to apply a Fast Fourier Transform to the windowed signals.

9. A leak detector according to claim 7, in which the processing device includes an averaging element, the averaging element adapted to calculate the root mean square average of the plurality of windowed signals from the first sensor following the application of the Fourier transform to each of the windowed signals and the root mean square average of the plurality of windowed signals from the second sensor following the application of the Fourier transform to each of the windowed signals.

10. A leak detector according to claim 1, in which the processing device includes a velocity determination element arranged to determine the velocity of the leak signals from the characteristics of the leak signals and the distance between the first sensor and the second sensor, wherein the velocity is obtained by the following equation;

$$c = \frac{-\omega D}{\phi_{x_1 x_2}^m(\omega)}$$

where c comprises the velocity of the signals, $\omega$ represents angular frequency, D the distance between the first and second sensors and $\phi_{x_1 x_2}^m(\omega)$ the phase of the product of the Fourier Transform of first signal ($x_1$) from first sensor and Fourier Transform of signal ($x_2$) from second sensor.

11. A leak detector according to claim 10, in which the processing device includes a leak location element adapted to receive the velocity calculated by the velocity determination element, the leak location element is also adapted to perform cross-correlation of the signal from the first sensor with the signal from the second sensor and using the results of the cross-correlation and the velocity, calculate the location of the leak with respect to either the first sensor position or second sensor position.

12. A leak detector according to claim 1, in which the processing device is adapted to fine filter the signals by applying a low-pass fine filter and a high-pass fine filter, the first filter settings define a first pass-band and the second filter settings define a second pass-band, contained within a narrower than the first pass-band.

13. A leak detector as claimed in claim 12, wherein the first pass-band is substantially below 760 Hz and above 10 Hz.

14. A leak detector according to claim 1 wherein the processing device is adapted to:
- perform cross-correlation of the signal from the first sensor with the signal from the second sensor;
- based on the cross-correlation, determine a time delay of the leak signals between the first sensor and second sensor; and
- using the velocity, the time delay and the distance between the first sensor and the second sensor, determine the location of a leak.

15. A leak detector according to claim 14 in which cross-correlation is performed over a frequency range, the frequency range defined by the second frequency settings or a coherence element, wherein the coherence element determines the coherence of the signal originating from the first sensor and the signal originating from the second sensor and defines the frequency range based on the determined coherence.

16. A method of detecting the position of a leak in pipes of plastics comprising the steps of;
- listening for a leak signal at a first position along a pipe;
- listening for a leak signal at a second position along the pipe spaced from the first position;
- fine filtering signals detected at the first and second positions using first filter settings;
- analysing the fine filtered signals from the first and second positions to identify a frequency range where leak signals are present;
- fine filtering the signals from the first and second sensors using second filter settings, based on the identified frequency range;
- determining a sensor spacing distance between the first position and the second position;
- using the leak signals fine filtered with the second filter settings to determine a the velocity of the leak signals from characteristics of the signals; and
- identifying a location of a leak using the sensor spacing distance and the velocity.

17. A method according to claim 16, in which identifying the location of a leak also comprises determining a time delay between the leak signals received at the first and second positions using a correlation function;
and
identifying the location of a leak using the sensor spacing distance, the velocity and the time delay.

18. A method according to claim 16, in which the method includes the step of performing cross-correlation with the signal obtained at the first position and the signal received at the second position.

19. A method according to claim 16, in which the method includes the step of confirming a leak is detected in the correlation function by determining if a distinctive peak is obtained.

20. A method according to claim 18, in which cross-correlation is performed over a frequency range of the leak signal between 0 Hz and 350 Hz.

* * * * *